Feb. 6, 1968
J. T. VOORHEIS
3,367,384
METHODS FOR BURNING FUEL, BURNERS AND SYSTEMS FOR BURNING
FUELS AND APPARATUS IN WHICH SAID BURNERS
AND/OR SYSTEMS ARE PARTS THEREOF
Filed May 9, 1966
5 Sheets-Sheet 1
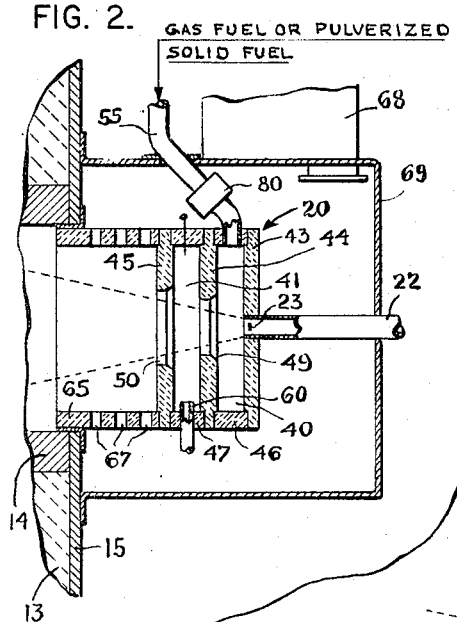
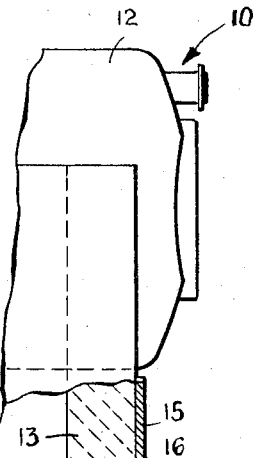
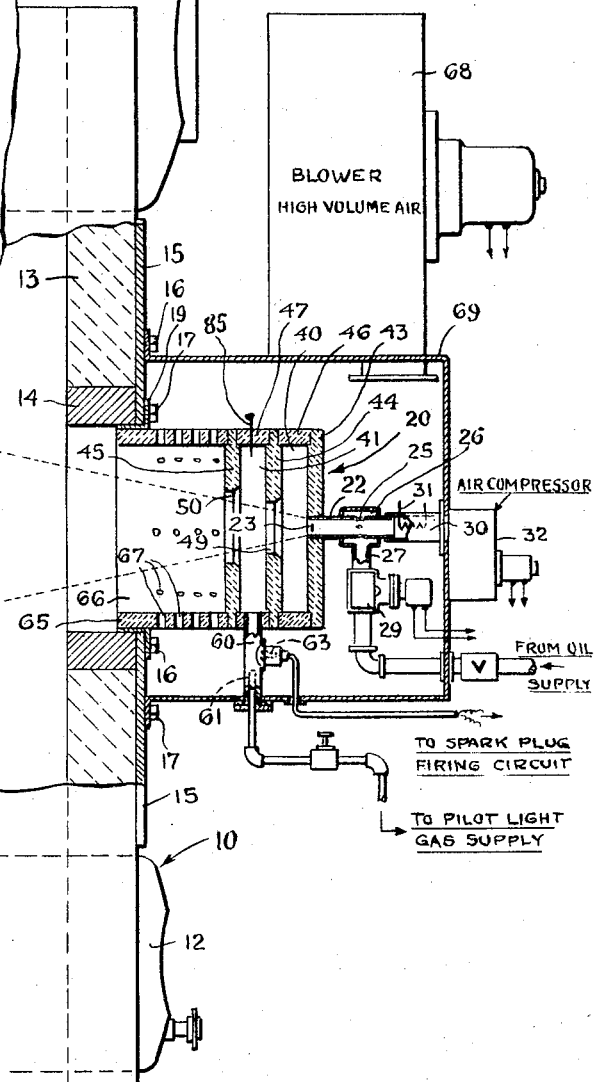
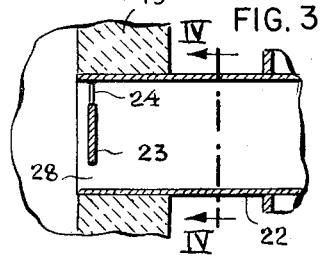
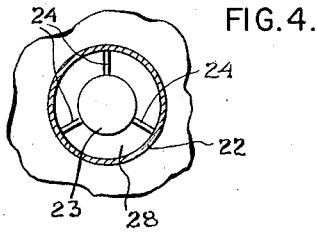
INVENTOR.
JAMES T. VOORHEIS
BY
Angelo M. Pisarra
ATTORNEY.

INVENTOR.
JAMES T. VOORHEIS
BY
Angelo M. Pisarra
ATTORNEY.

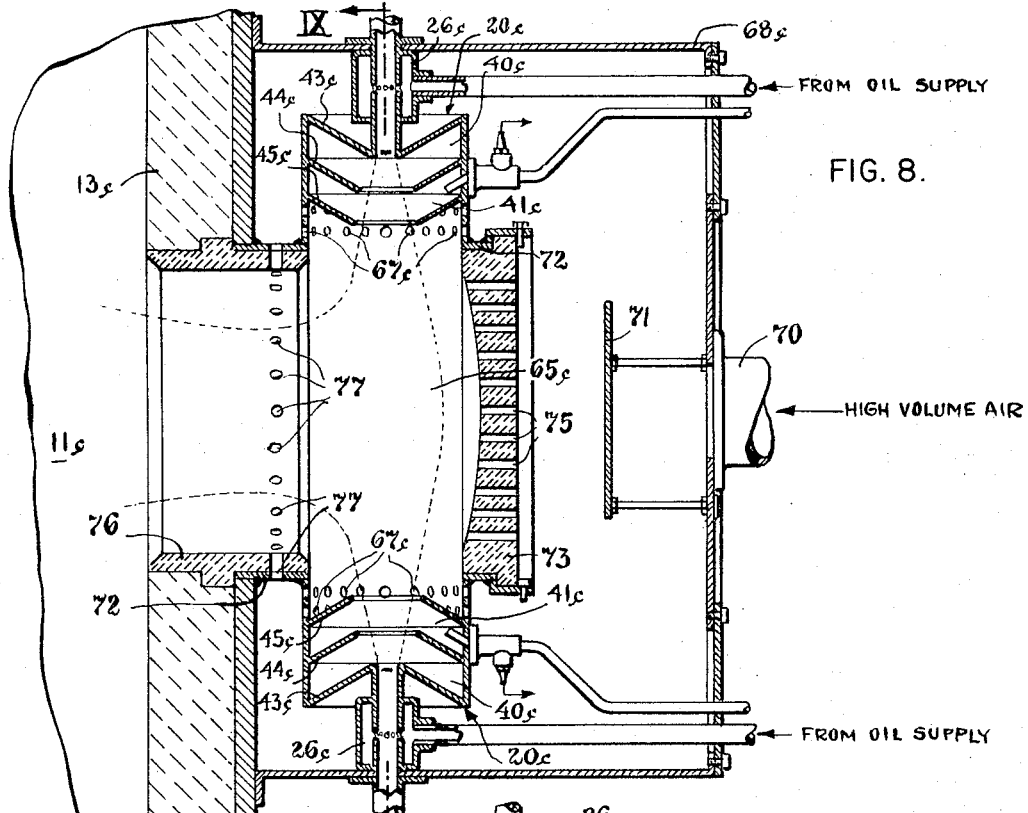

Feb. 6, 1968  J. T. VOORHEIS  3,367,384
METHODS FOR BURNING FUEL, BURNERS AND SYSTEMS FOR BURNING
FUELS AND APPARATUS IN WHICH SAID BURNERS
AND/OR SYSTEMS ARE PARTS THEREOF
Filed May 9, 1966                                    5 Sheets-Sheet 4

INVENTOR.
JAMES T. VOORHEIS
BY
Angelo M. Pisano
ATTORNEY.

Feb. 6, 1968  J. T. VOORHEIS  3,367,384
METHODS FOR BURNING FUEL, BURNERS AND SYSTEMS FOR BURNING
FUELS AND APPARATUS IN WHICH SAID BURNERS
AND/OR SYSTEMS ARE PARTS THEREOF
Filed May 9, 1966  5 Sheets-Sheet 5
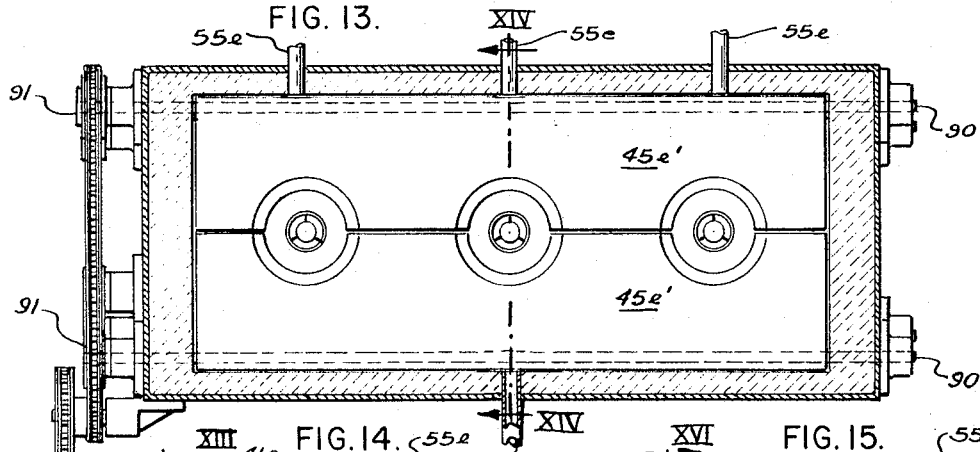
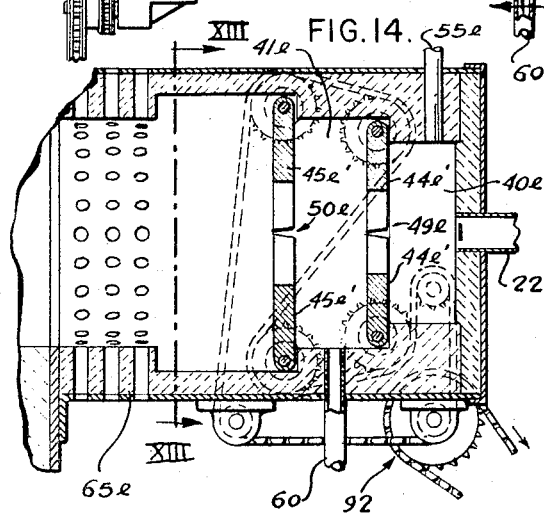
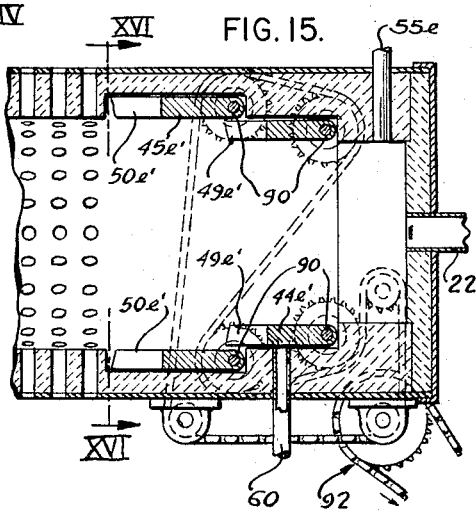
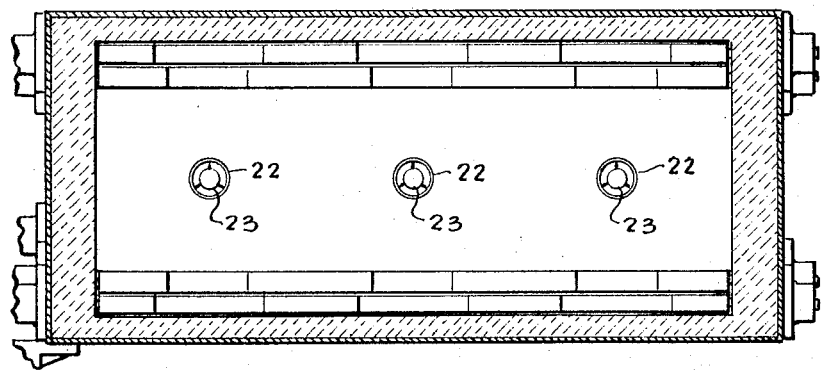
INVENTOR.
JAMES T. VOORHEIS
BY
Angelo M. Pisarra
ATTORNEY.

United States Patent Office 3,367,384
Patented Feb. 6, 1968

3,367,384
METHODS FOR BURNING FUEL, BURNERS AND SYSTEMS FOR BURNING FUELS AND APPARATUS IN WHICH SAID BURNERS AND/OR SYSTEMS ARE PARTS THEREOF
James T. Voorheis, 105 Rensselaer Road, Essex Fells, N.J. 07021
Filed May 9, 1966, Ser. No. 548,451
48 Claims. (Cl. 158—1)

ABSTRACT OF THE DISCLOSURE

This invention relates to burning fuel and more specifically is directed to novel methods for burning fuel, to novel fuel burners, to novel systems for burning fuels and also to novel apparatus in which said novel burners and/or systems are part thereof.

Summary of the invention

The methods and apparatus of this invention in one aspect comprises continuously producing a mixture of air and fuel to be burned, continuously feeding the mixture in a non-whirling path through outlet means in the downstream side of a chamber by continuously feeding from a nozzle into and through the chamber and outlet means a non-whirling air stream comprising said air, and having a nozzle velocity in the range of about 150–1200 feet per second, igniting the mixture downstream of the nozzle, said feeding of the mixture creating and maintaining ejector action in the chamber to reduce and maintain static pressure in the chamber to less than that in space adjacent to and downstream of the chamber so that after ignition some of the matter downstream of said side continuously travels upstream through the outlet means and into the chamber to aid in heating the stream and to aid in preventing flame-out. The outlet means may be single or multiple; the mixtures feeding through them may be single or multiple and the nozzles may be single or multiple. A stream so feeds out of each nozzle and a mixture so feeds through each outlet which is in approximate alignment with a particular nozzle. The mixture feeding from an outlet in said downstream side of the chamber preferably feeds into and through a second chamber and an outlet in its downstream side to create and maintain ejector action therein to reduce and maintain static pressure therein to less than that in space adjacent to and downstream of said downstream side of said second chamber but greater than the static pressure in the first mentioned chamber whereby matter downstream of said downstream side of said second chamber travels substantially continuously upstream through an outlet in said downstream side of said second chamber and into said chamber to aid in heating said mixture passing therethrough. In another aspect the apparatus comprises a fuel burner comprising said first chamber, preferably in communication with said second chamber, both of which are substantially imperforate, with the outlets in said chambers being so positioned and dimensioned that the ejector actions are created and maintained by said continuous feeding through said outlets.

Prior to this invention many others have proposed a great many different apparatus and methods for providing and burning fuel in fuel laden steam and/or air streams. In this old and highly crowded art, Good in U.S. Patent 1,803,967 issued May 5, 1931, proposed a burner consisting of a nozzle head having an elongated fuel receiving and discharging opening in which is located a spiral vaned element for shattering the fuel supplied and to give it a whirling motion as it issues from the opening under the pressure of the liquid supplied. The resultant emergent spray obviously travels in a whorling path and consequently is in the form of a divergent stream of particles traveling in a curvilinear path of increasing diameter. The patentee desired to control the volume of spray reaching the combustion zone and proposed to achieve this by intercepting certain proportions of the stream in the course of its travel from the nozzle towards said zone. For this purpose he proposes a number of different types of spray interceptors, one of which is in the form of an adjustable hinged scoop and the other is in the form of an adjustable pair of intercepter members having central openings therethrough for the passage of only a portion of the whorling or whirling spray mass, with one of them having an opening therethrough for the passage of intercepted fuel and in communication with an opening for the passage of the fuel intercepted by both of said interceptor members. The burners proposed by the patentee are limited to the burning of non-residual liquid fuels for the reason that if one tried to use same for the burning of a residual fuel, as for example, a #6 fuel oil also known as "Bunker C," the burners would quickly be rendered inoperative due to the build-up of carbonaceous material on the interceptors. Turpin in U.S. Patent 2,368,179 of Jan. 30, 1945, proposed a weed burner consisting of an atomizer through which is fed a mixture of fuel and air as a stream into and through a throat member or chamber having an outlet opening and four other openings therein. As shown in the drawings each of the four openings has a diameter greater than one fourth that of the outlet opening and serve a dual purpose, to admit air into the chamber and also to deliver out of the chamber the fuel intercepted by the side of the chamber containing the outlet opening. It also includes an elongated cup or casing having eleven larger air inlet openings therein and a partition extending across the casing to intercept a portion of the stream of products of combustion in the stream. The cup or casing has an outlet opening eccentric with respect to the outlet in the chamber so that a portion of the stream is intercepted by said casing. This burner also is obviously limited to burning of non-residual fuels.

Nerad in U.S. Patent 2,869,629 of January 20, 1959, proposed a fuel burner consisting of a fuel tube spaced coaxially within an outer inlet air casing carrying a pair of inwardly curved flat strips resembling flat ribbon-shaped hooks whose outer free termini are spaced from each other. According to the patentee the fuel and air mixture is ignited in the space between said strips to provide an initial flame which extends through and upstream of the free termini of the strips. As shown in the drawings, the distance between said free termini measures about one-half the diameter of the outlet casing so that a considerable portion of the flame is intercepted by the strips whereby it is mechanically peeled off of the stream.

After more than twenty years experience in the manufacture, design and installation of fuel burners and after extensive and costly experimentation in this field, I have made the present inventions which consist of novel and unobvious combinations of parts and also novel methods for using them whereby long felt needs are satisfied due to the unique combination of characteristics thereof and also due to the unique combination of results achievable therewith.

The unique combination of features includes a simplicity, inexpensiveness of manufacture of parts, assembly, installation and maintenance, ruggedness, long life, foul-free parts, burner parts not subjected to heat attrition, low fuel pressure requirement, low air pressure requirement, low power requirement, high efficiency, clean combustion, low draft loss, high safety, high reliability, positive flame retention, the flame patterns and placements are easily controlled and optimized.

Besides these unique features, which are present or achieved in practicing the present invention due to the unique principles employed, the novel systems are such that novel and unique methods may be used to achieve many of the foregoing features and especially those dependent upon the operation thereof.

The foregoing as well as other features which represent some of the objects and advantages of the invention herein, are present or achieved in practicing these inventions which in one of its aspects is a novel burner.

According to this invention, one of the class of novel burners include a chamber having an outlet opening therein for the continuous passage therethrough of a non-whirling fuel laden air stream, a pilot for initially igniting said stream preferably on the downstream side of said chamber, said opening being so dimensioned and positioned that said stream passing through said opening will create ejector action to reduce static pressure in said chamber to less than that adjacent to and downstream of said chamber, some fuel and air matter downstream of said chamber travels upstream into said chamber in a direction opposite to the direction of travel of said stream as it passes through said chamber due to lower static pressure therein and after the stream has been initially ignited by said pilot flaming fuel will automatically propagate upstream in said chamber wherein the low-velocity-upstream-educed fuel and air matter burns and liberates heat which is greatly absorbed by the principal fuel laden air stream. The chamber walls also absorb heat but soon reach a temperature where they also radiate heat to the principal fuel laden air stream. Said enhanced combustion also serves to aid in preventing accumulation therein of stray fuel particles from said stream and therefore prevents carbon build up therein.

Those burners of this invention preferably include, in alignment with said chamber, a pre-main combustion chamber and/or a second chamber having an outlet larger than that outlet in the first chamber and dimensioned and positioned that the stream passing therethrough creates ejector action to lower static pressure to less than that adjacent to and downstream thereof but greater than static pressure in said first chamber, some matter downstream thereof travels upstream in said chamber due to the lower static pressure therein. Said pilot is preferably located in said second chamber initially to ignite said stream preferably in said second chamber. Said back feed which also substantially continuously occurs in said second chamber enhances combustion therein as evidenced by a continuously burning mass or fire filling that chamber thereby serving the same purposes as the enhanced combustion in said first chamber. This second chamber serves as a safety factor in aiding the prevention of and practically eliminating the danger of flame-out and also serves as a means wherein initial ignition of the stream is to be effected. The pre-main combustion chamber has openings for the passage of air thereinto for the substantial completion of combustion of the fuel. Due to the preheating and some gasiformation of the fuel in a colloidal state in the first chamber and further preheating, diffusion and gasiformation in the second chamber, the fuel enters into the pre-main combustion air zone defined by said pre-main combustion chamber. The pre-main combustion chamber has ports therein spaced along the length thereof whereby air is introduced therethrough for imparting turbulence and eddy diffusion. The air molecules from the first row of ports combine with some fuel molecules in the traveling stream in general accordance with a collision pattern dictated by many factors, but most likely with the fast moving and/or hotter fuel molecules. With this heat liberation, additional heating of the mass and gasiformation takes place prior to admission of air from the next row of ports. This occurs progressively in the traveling stream whereby a highly transformed greatly pre-mixed fuel and air stream, whose fuel component has been appreciably gasiformed, enters a furnace to complete combustion with the necessary additional passage of time in accordance with the variables of the flaming mass, furnace configuration, temperature, pressure and exit gas velocities.

The novel burner of this invention with or without means for force feeding air radially into the pre-main combustion chamber, is in combination with other apparatus for providing novel systems. These combinations include a conventional air compressor of the rotary type, rated at least 2 p.s.i. but no greater than 20 p.s.i., for most purposes no greater than 10 p.s.i. and optimumly no greater than approximately 6 p.s.i., for supplying stream air, also conventional devices or mechanisms for supplying the fuel together with a control for at will varying the rate of fuel supply.

The novel systems of this invention are embodiments of some systems which may be used to practice the novel methods of the present invention. The novel methods comprise, while feeding air in a non-whirling path through the terminus of the discharge end of a conductor therefor at a velocity in the range of about 150–1200 feet per second depending upon pressure and temperature and preferably about 200–450 feet per second, a mixture of fuel and said air is fed thereby through the outlet opening of the first chamber, obviously at lower velocity, and then is initially ignited by a flame from a pilot operating at that time preferably downstream of said chamber and in said second chamber. The ejector actions, feed backs, etc., heretofore described occur and the flame is continuously and substantially uniformly maintained with a particular rate of fuel feed which had been previously controlled by a simple adjustment of a control in the fuel feeding line. The amount of air in said mixture passing through said outlet opening in said first chamber is greatly less than that required for complete combustion of the fuel therein and generally is less than 10% thereof by weight at maximum firing rate.

The amount of heat may be varied by merely changing the control in the fuel line to either increase or lower the rate of fuel supply with or without increasing the rate of stream-air supply for said mixture. It is preferable to maintain the rate of air supply approximately constant which is one of the features of this present invention which permits a wide variation in firing rates without changing the rate of air supply. The firing rate is readily and easily at will changeable by the operator by merely appropriately adjusting a conventional control in a conventional valve or pump to increase or decrease the rate of fuel supply.

The foregoing objects and advantages as well as others of the present invention will be apparent from the following description taken in conjunction with the accompanying drawings, wherein:

FIG. 1 is a view partly in cross section and partly in side elevation of an embodiment of a novel apparatus of the present invention.

FIG. 2 is a view mostly in cross section, showing a modification of part of the embodiment shown in FIG. 1.

FIG. 3 is an enlarged sectional view of a fragment of the apparatus shown in FIG. 1.

FIG. 4 is a cross sectional view taken on line IV—IV of FIG. 3.

FIG. 8 is mainly in cross section and illustrates another modification of the apparatus shown in FIG. 1 and shows a novel multiple burner apparatus.

FIG. 9 is a view taken on line IX—IX of FIG. 8.

FIG. 13 is a longitudinal cross sectional fragmentary partial view of another type of burner.

FIG. 14 is a cross sectional view taken on line XIV—XIV of FIG. 13, but being a mirror image thereof.

FIG. 15 is a view similar to FIG. 14, but with the throat members being in open position.

FIG. 16 is a cross sectional view taken on line XVI—XVI of FIG. 15.

Figure 5:
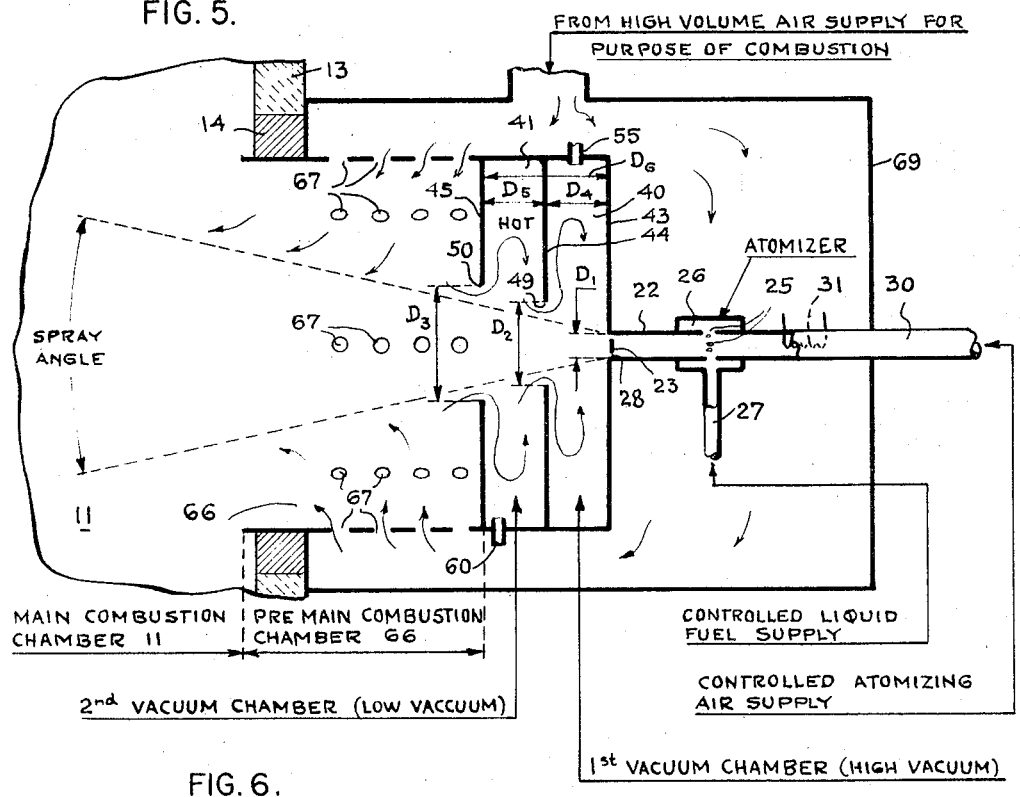
FIG. 5 is a diagrammatic view illustrating the new principles employed in the practice of the inventions.

Referring to FIG. 1, a part of a conventional furnace or boiler 10 is shown and comprises a refractory-lined fire box defining a combustion space or chamber 11 in which fuel is to be mainly burned to release heat mainly in said space, and a pair of boiler drums (connected by tubes) 12 spaced from each other and at least partially surrounded by space 11 so that they are heated by the heat released. The fire box is in communication with an opening at one end (not shown) for the passage of the products of combustion out of said space 11. The other end of said fire box is a refractory wall 13 having an opening therein accommodating a high-heat resistant collar 14 maintained in position by a plate 15 secured to collar 14 and wall 13 by bolts 16 and 17. The plate 15 has an opening therethrough in registry with that through collar 14 for communication with the discharge end of a novel burner 20, which is part of a novel system, to provide a novel apparatus with said boiler 10.

In the embodiment shown in FIG. 1, the novel burner 20, in one of its preferential forms, comprises a nozzle consisting of a hollow cylindrical tube 22 having a partial closure 23 at the discharge end thereof. Element 23 is in the form of a disc whose diameter is less than the internal diameter of cylinder 22. It is secured to thin radial supporting legs 24 secured to cylinder 22, is located in cylinder 22 near the terminus of the discharge end thereof and is centrally and so disposed in cylinder 22 that its radii are approximately coincident with the radii of the cylinder 22 thereat. A plurality of small radial openings 25 therethrough for admission of fuel in thin radial streams into cylinder 22. A hollow collar extends around openings 25 and is coupled with cylinder 22 to provide a fuel receiving chamber 26. Chamber 26 has an inlet port accommodating a conduit 27 for conducting fuel under pressure and in the fluid state into chamber 26 fed thereto by a fuel pump 29 connected to a source of fuel supply which may or may not include a heater therefore depending upon the type of fuel to be used. The fuel pump may be any of the conventional types on the market and includes a control (not shown) for changing the fuel pressure whereby the operator may at will change the rate of feed of fuel into tube 22. Element 23 is located between the discharge terminus of tube 22 and openings 25 and at said location defines a substantially annular discharge orifice 28. Air under pressure is supplied to said cylinder 22 through conduit 30 connected to the inlet end thereof and to an air compressor 32. Mounted in said conduit 30 is an electrical resistor 31 for supplying heat when desired or required to the air from the compressor. Resistor 31 is connected to a variable source of electric power (not shown) for at will varying the temperature thereof, thereby to at will varying the temperature of the air reaching the nozzle 22 and emanating therefrom. The air compressor 32 employed is one of the types heretofore described and capable of delivering air under pressure of at least 2 pounds per square inch, but is incapable of delivering air under pressure greater than 20 pounds per square inch.

While air compressors having a rating of 2 pounds per square inch or any other value up to 20 pounds per square inch may be used, it is preferred to employ only such of them whose rating is not in excess of 10 pounds per square inch and optimumly not in excess of about 6 pounds per square inch.

A plurality of chambers 40 and 41 are coupled and in line with said nozzle and are in communication with the cylinder 22 at the discharge end thereof. Chambers 40 and 41 are formed by three substantially imperforate refractory discs or sides 43, 44 and 45 spaced from each other and disposed in substantially parallel relationship, with sides 43 and 44 sealed to a substantially imperforate refractory short cylinder 46 and sides 44 and 45 sealed to a substantially imperforate refractory short cylinder 47 and said chambers obviously are imperforate. The disc 43 has a centrally disposed inlet opening therein accommodating the discharge end of said cylinder 22 which preferably makes a tight fit with disc 43 at the opening therein. The disc 44 has a centrally disposed circular opening 49 therein which serves as an outlet opening for chamber 40 and an inlet opening for chamber 41. The disc 45 has a centrally disposed circular outlet opening 50 therein. The centers of these three discs are in alignment and the diameter of opening 49 is preferably greater than that of tube 22 and the diameter of opening 50 is preferably greater than that of opening 49. The rear edges of those portions of discs 44 and 45 are chamfered as shown in FIG. 1, or alternately not chamfered.

The distance $D_4$ between discs 43 and 44 and that $D_5$ between discs 44 and 45 may be the same or different. Each of the distances $D_4$ and $D_5$ generally is in the range of about 1″ to about 7″, being of lower values for domestic and commercial installations and of high values for industrial and marine installations, and in the latter is preferably in the range of about 2½″ to about 5″. In this specific embodiment the thickness of each disc 44 and 45 is approximately 1″ and the distance $D_5$ is approximately 3″, although it may be less or greater as desired and depending to some extent upon the velocity of the stream and in general is the same as $D_4$ although it may be less or greater than $D_4$. The diameter or height of the chambers 40 and 41 may be the same or different and in each case is greater than $D_3$ and preferably about 1½–5 times $D_3$ and in this specific embodiment is the same as $D_6$.

The diameters of respective openings 49 and 50 are such that when a stream of fuel and air is traveling from said nozzle at a velocity in the broader range heretofore defined, essentially all (95% or more and preferably at least 98% by weight) of the fuel therein will pass through said openings. The diameters of said respective openings 49 and 50 are restricted and so limited that the passage of said stream therethrough creates an ejector action in each opening 49 and 50 thereby reducing and maintaining static pressure in chamber 40 to less than that in chamber 41 and static pressure in chamber 41 to less than that in space adjacent to and downstream of disc 45. Although of such limitations, the dimensions of openings 49 and 50 are sufficiently large as to permit the passage of some of the resulting mass of said stream when in flaming condition downstream of said sides 45 and 44 to travel upstream through said respective openings 50 and 49 and thence into respective chambers 41 and 40. The diameter $D_2$ of opening 49 and diameter $D_3$ of opening 50 are obviously to some extent dependent upon the distance between the discharge terminus of tube 22 and side 44 and between sides 44 and 45, and in this specific embodiment where $D_1$ is about ½″, and the velocity of the stream at the terminus of tube 22 is about 280 feet per second, for good results $D_2$ is about 3½″, $D_3$ is about 4″ and $D_4$ and $D_5$ are each about 3″. However, even under such conditions, their values may be changed to some extent. These dimensions are maintained in the following parameters: $D_2$ is in the range of about ⅔ to about 1⅓ times the sum of $D_4$ and $D_1$, and $D_3$ is in the range of about ⅔ to about 1⅓ times the sum of $D_1$ and one-half of $D_6$. $D_1$ is preferably in the range of about ⅛″ to about 2″, or more. When the fuel oil to be burned is of the type known to the art as "#6 fuel oil" or "Bunker C," I prefer that $D_4$ be in the range of about 2″ to 5″. In fact, in its most preferential form $D_4$ and $D_5$ are each in the range of about 2″–about 5″ so that non-residual fuel oils of low viscosities, such as kerosene, "stove oil," diesel oils, etc., as well as the residual oils, such as "Bunker C" and others may be used.

As shown in FIG. 2, element 46 of the chamber 40 preferably has one or more ports at the upper part thereof with each accommodating a conduit 55 for conducting fuel into chamber 40 by suitable conventional mechanism (not shown), connected to conduit 55 and capable of being adjusted to at will change the rate of fuel fed into chamber 40.

The cylinder 47 has a port therein accommodating a conventional or other type pilot 60 for providing a pilot flame for igniting the fuel in the stream. The pilot 60 comprises an aspirator tube 61 connected to a source of fuel-gas supply and carries a spark plug 63 electrically connected to a spark plug firing circuit for pilot ignition.

A cylinder 65 of about the same diameter as cylinder 47, is in alignment with cylinders 46 and 47 and one end thereof is sealed to the side 45, and the other end thereof extends through the central opening in plate 15 and into the collar 14. Cylinder 65 has a number of rows of radial openings 67 therethrough for the passage of forced air or natural draft air into the zone 66 of cylinder 65. Forced air into cylinder 65 is effected by a blower 68 of a wind-box 69 to provide a relatively high air volume in zone 66 which serves as a pre-main combustion zone or space in communication with the main combustion space 11. The wind-box 69 is secured to and anchored to the side 15 by the bolts 16. A narrow angle ring 19 is anchored to the side 15 and makes a tight fit with the cylinder 65 passing through its central opening to aid in supporting said cylinder 65 and in maintaining said nozzle, chambers 40 and 41 and cylinder 65 in position. Other supporting means obviously may be used.

Figure 6:
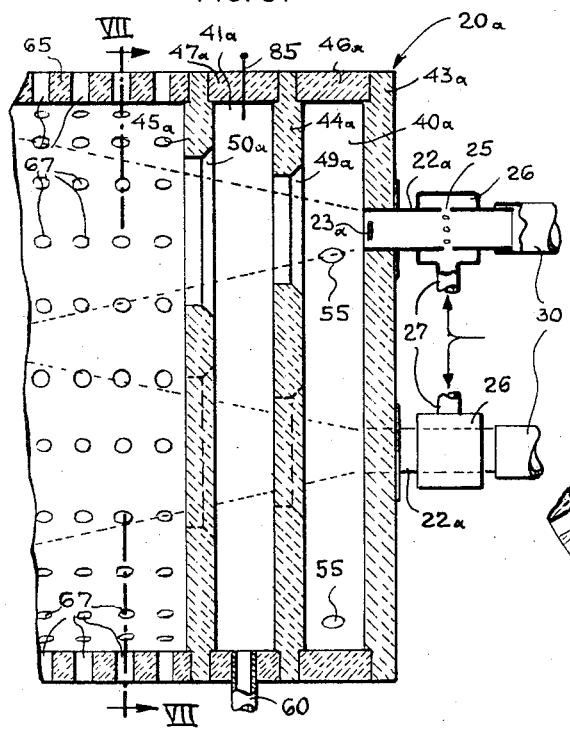
FIG. 6 is a modification of the burner shown in FIG. 1 and shows a burner in which three streams are produced and are arranged in a circle.
Figure 7:
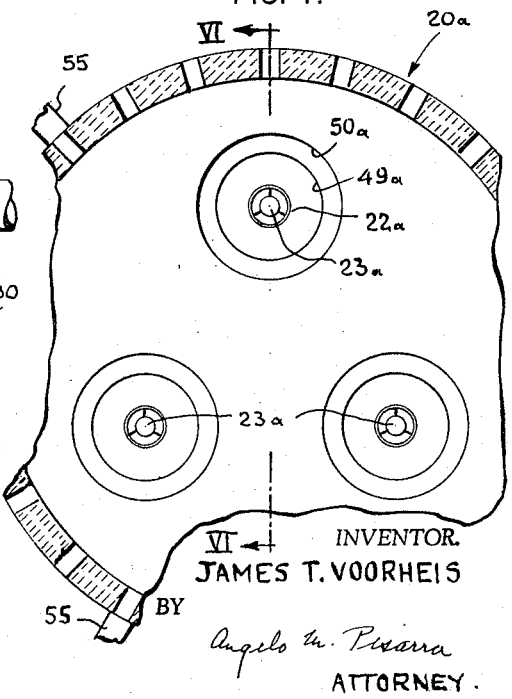
FIG. 7 is a fragmentary cross sectional view taken on line VII—VII of FIG. 6.

Referring now to FIGS. 6 and 7, there is shown a modification of the burner shown in FIGS. 1 and 2 and represents a multiple nozzle burner 20a. This burner is essentially the same as the single nozzle burner and differs therefrom mainly in having a plurality, and as shown three nozzles in combination with chambers 40a and 41a therein similar to and of greater diameters than chambers 40 and 41, with the sides 44a and 45a each having three sets of openings 49a and 50a positioned and dimensioned as 49 and 50. The three individual tubes 22 are so arranged that their axial center lines are spaced about 120° apart and each of them is connected to a separate air compressor 32 or all of them are connected to a single compressor 32, each aligned with a pair of openings 49a and 50a.

Figure 12:
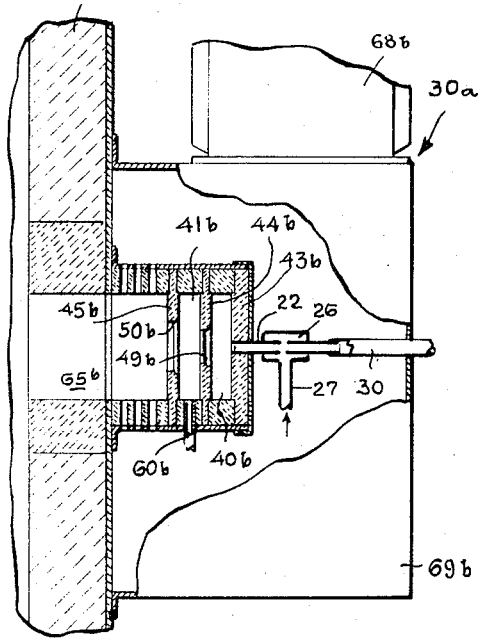
FIG. 12 is a view mostly in cross section of the apparatus shown in FIG. 11.
Figure 11:
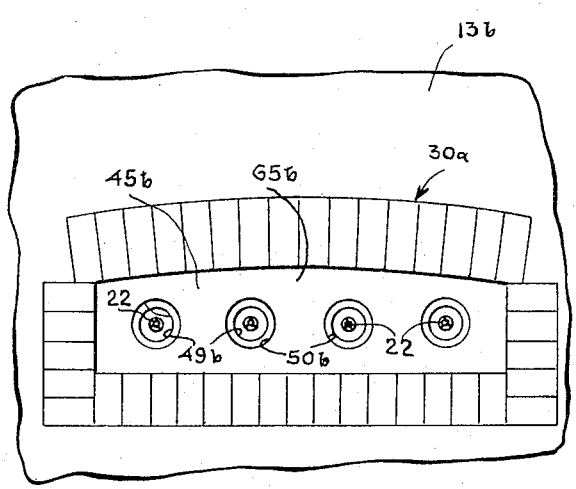
FIG. 11 is a front view of still another modification of the burner shown in FIG. 1.

Referring now to FIGS. 11 and 12, there is shown a further modification of the burner shown in FIGS. 1 and 2 and represents an in-line or side by side multiple nozzle burner 30a. This burner is essentially the same as the single nozzle burner and differs therefrom mainly in having a plurality, and as shown four nozzles in combination with elongated box-type chambers 40b and 41b otherwise similar to chambers 40 and 41, with the sides 43b, 44b and 45b being similar to sides 43, 44 and 45 except that they are rectangular, with side 44b having four openings 49b similar to openings 49 and in alignment with tubes 22, and side 45b having openings 50b similar to openings 50 and in alignment with tubes 22. The pre-main combustion chamber 65b is similar to chamber 65 and differs therefrom mainly in being box-like rather than cylindrical. Each of the tubes 22 is connected to an air compressor 32 or in battery are connected to a single air compressor 32. Also the chambers 26 of the battery of nozzles shown in FIGS. 6 and 7 and in FIGS. 11 and 12 are connected to a common header through which the fuel under pressure is fed into the chambers. In the arrangement shown in FIGS. 11 and 12, the tubes 22 are arranged in parallel, with the axes thereof being in a straight line. Instead of employing a single multiple nozzle burner of the type shown in FIGS. 6 and 7 or that shown in FIGS. 11 and 12, individual burners 20 may be so arranged. However, it is preferable for the purposes intended to use such multiple nozzle burners.

Another type of burner arrangement is shown in FIGS. 8 and 9 where limited furnace space is a factor. In this embodiment the flames from the burners do not extend entirely along a straight line from the nozzles as they do from those in FIGS. 6 and 7 and 11 and 12. In this embodiment where a plurality, and as shown 6 burners are arranged as spokes of a wheel and are disposed about 60° apart. In this embodiment the windbox 68c is in the form of a large cylinder whose back end is covered and has a large conduit 70 connected to a blower for supplying a large volume of air into said box. The cover also carries a baffle 71 against which the air from the blower strikes as it enters said box, spreading it therethrough thereby to divert a considerable proportion thereof towards the sides of the box. Each of the six burners shown is essentially the same as that of FIGS. 1 and 2 with flat annular discs defining communicating chambers 40 and 41 or the frusto-conical discs 43c, 44c and 45c may be used instead to provide chambers 40c and 41c in communication with each other and with the space in pre-combustion chamber 65c similar to chamber 65 and having air admission openings 67c. The open ends of the chambers 65c are secured to a ring 72 secured to plate 15c secured to refractory side 13c of furnace 10c. Ring 72 is secured to a refractory collar 76 in communication with main combustion space 11c of furnace 10c. Ring 72 and collar 76 have a plurality of cylindrical openings 77 for admission of air. The individual burners 20c are secured to said ring 72 at the openings therein and are so arranged in three pairs, with the axes of each pair being in alignment. Rear of ring 72 may be completely closed at its rear end by a plate or cover 73 which may be imperforate but preferably has a plurality of axial air passageways 75 for the admission of air therethrough thereby to provide a stream of air consisting of a composite of individual air streams under pressure traveling at about right angles to the normal path of flames from the individual nozzles 20c. Openings 75 may have vanes or other elements therein, if desired, for imparting a whorling motion, clockwise or counterclockwise or some being clockwise and others counterclockwise to air streams emanating therefrom and striking the burning streams thereby to impart turbulence thereto to aid in mixing thereof.

Figure 10:
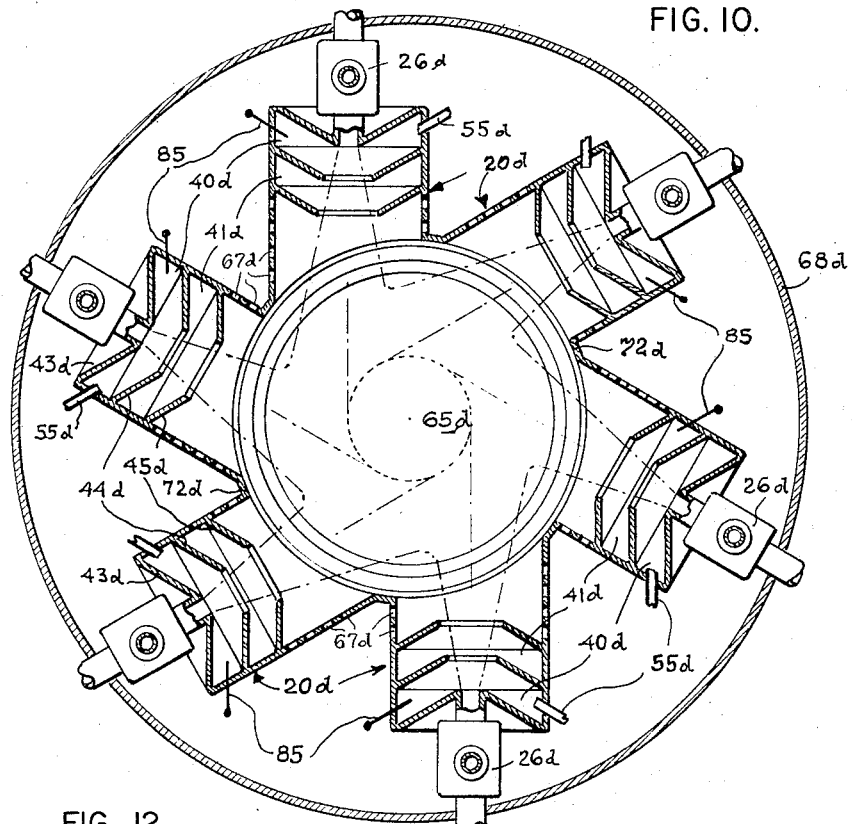
FIG. 10 is still another modification of the burner shown in FIG. 1, and also shows another type of multiple burner apparatus.

The modification shown in FIG. 10 is essentially the same as that shown in FIGS. 8 and 9 except for the angular disposition of the individual burners. In this embodiment each burner 20d is so disposed that its axial center is coincident with a line which is approximately tangential to an imaginary circle of appreciable diameter which is less than the diameter of supporting ring 72d similar to ring 72. This departure from the radial may be to either side to impart clockwise or counterclockwise spin to the flaming mass. The discharge end of the pre-main combustion chamber 65d of each burner therein obviously differs from that of chamber 65 in that it is not at right angles to the axis thereof but is at an angle thereto. Otherwise, chambers 65 and 65d are alike, except that if desired, although this is not necessary, the discs 43d, 44d and 45d may be frusto-conical as shown to provide chambers 40d and 41d of the type shown in FIGS. 8 and 9.

The following methods are other aspects of this invention which may be practiced by utilizing the inventions heretofore described. The electrically driven direct drive, compressor 32, which is used in this instance has a rating of at least 2 p.s.i. and no greater than 8 p.s.i. and is one of such conventional compressors which is relatively inexpensive, of moderate duty and extremely long life and capable of discharging warm dry air directly out of its discharge outlet into conduit 30. Illustrative examples of some of them are the type AF Rotary Positive Roots-Connersville air compressor sometimes called AF blowers, such as the AF–22, AF–33, AF–44, AF–55 (compressors) sold by them and rated 6 p.s.i. The compressor 32 is in operation to supply air continuously through tube 22 and orifice 28 through chambers 40 and 41, cylinder 65 and into the main combustion space or zone 11. The conventional pump 29, or a modulating valve which has been pre-set, is rendered operable to continuously discharge fuel under pre-selected pressure to the chamber 26 and then through the very narrow radial openings of any desired and appropriate number through tube 22. In this manner fuel is fed at a fixed rate in the form of very thin radial streams into the tube 22. The fuel pressure employed need not exceed about 50 p.s.i. with fuel fed into tube 22 at 200 SSU and the air at 3–5 p.s.i. (100–400° F.) from the compressor which is constant and not modulated need not exceed 4 cubic feet per pound of fuel in this particular instance. In this particular illustrative example of the method employed, the fuel is supplied by pump 29 at a pressure of about 50 p.s.i. whereby the rate of fuel feed is 16 pounds per minute. The fuel fed into tube 22 is in the fluid state and in this instance is in the liquid state and is one, preferably petroleum or from petroleum source, which is either normally liquid, semi-solid, or solid, and if not normally liquid has been preheated by conventional pre-heaters to the liquid state and appropriate and desired viscosity. The fuel in its liquid state as it is fed into tube 22 has a viscosity no greater than 400 SSU.

As these fine streams of fuel in the liquid condition are forced into the continuously feeding air, they are broken up into small particles and a considerable proportion thereof is carried to and torn from the edges of baffle 23 whereby said particles are further size reduced or atomized thus continuously providing a finely atomized fuel and air mixture which is fed at a substantially constant rate out of the orifice 28 and then through the discharge terminus of tube 22. In this illustrative example, the mixture travels out of said terminus at a velocity in the preferred range of about 200–450 feet per second, for example about 280 feet per second. The fuel laden air mixture traveling out of said terminus is in the form of a non-whirling narrow hollow cone due to its natural angle of divergence, which is in the range of 20°–30° and in this instance is approximately 25°. This conical stream is fine colloidal mist most of which is in particle size below 100 microns and a good fraction of which is in particle size below 50 microns. This stream travels into chamber 40, through outlet 49 into the chamber 41, through outlet 50, into and through pre-main combustion zone of cylinder 65 and then into the main combustion space 11. A short time prior to the time that said mixture is admitted to the chamber 41, the pilot therein is ignited to provide an ignition flame which persists for about 10 seconds. Upon reaching the chamber 41 which in one respect acts as a "fume trap" for ignition, the mixture is initially ignited by the pilot and the continuously feeding stream of fuel and air propagates forwardly through cylinder 65 and terminates in space 11. Initial ignition of said stream occurs in chamber 41, with the upstream end of the flame initiating in that chamber. But, shortly thereafter outlet 49 warms to a sufficiency where the flame propagates further upstream through opening 49 into chamber 40 usually evidenced by an audible snap sound and visually as can be seen through a "window" which may be provided in chamber 40 for that purpose. Visual observation shows the upstream end of the flame being well within chamber 40 as a flaming outer column terminating near the terminus of tube 22. Said flame is continuously maintained in substantially constant flame pattern, flame position and positive flame retention conditions.

While light-off, that is initial ignition, may be achieved without the use of second chamber, such as 41, its presence is of decided importance and therefore is preferably used for a number of different purposes and especially for lighting off cold therein when provided with suitable means for providing a pilot flame or the like therein for that purpose.

Due to the dimensions and positions of the openings 49 and 50 in this specific embodiment, essentially all and in this instance at least 99% and apparently at least 99.5% by weight of the fuel in the traveling fuel laden air stream passes through opening 49 whose diameter is about 25%–about 75% greater and in this embodiment approximately 50% greater than that of a section thereat of a 25° imaginary cone whose altitude is coincident with the axis of tube 22 and whose side passes through the discharge terminus of tube 22. As the stream passes into and through chamber 41 obviously at progressively decreasing velocity, essentially all as before of the fuel component thereof passes through openings 50 due to the positioning and dimensions thereof. However, a very small proportion of said stream entering chamber 41 and in the form of very fine mist particles are diverted from these flight paths by some air flowing back into chamber 41 due to the static pressure differential between the chamber 41 and that in space adjacent to and downstream of side 45 as a result of the ejector action created by the stream passing through opening 50. Thus the chamber serves as a fume trap whereby lighting off cold is achieved. Light-off, that is initiating combustion, is immediate downstream of the interior of chamber 40 and the chamber 41 is then continuously filled with fire due to more air continuously flowing back or back feeding into chamber 41 and continuously bringing some fuel mist with it. With such continuous burning in chamber 41, the throat defining opening 49 is heated in a few seconds to such elevated temperature that the flame automatically propagates upstream into chamber 40 where the mist particles traveling at higher velocities require radiating and gas temperatures greater than initial ambient to sustain propagation.

Said continuously burning stream extends from near the end of tube 22 into space 11 and is so maintained whereby positive flame retention and efficiency are achieved due to the following as shown diagrammatically in FIG. 4. Due to static pressure in chamber 40 being less than that in chamber 41 and that in chamber 41 being less than that in space immediately adjacent to and downstream of chamber 41, some of the matter, fuel from said stream and air, downstream of side 45, feed back through opening 50 into chamber 41 and some of the matter, fuel and air feed back continuously through opening 49 into chamber 40. The feed backs continuously traveling into the confined spaces defined by said chambers and combine with matter therein to maintain continuously therein fire which fills said chambers. This automatically continuously maintained enhanced combustion in chamber 40 acts to preheat the stream, to aid in the gasification of the colloidal fuel therein to aid in the diffusion of the fuel in the stream, to aid in burning and preventing accumulation therein of stray fuel particles from said stream of fuel which did pass through opening 49, to aid in the prevention of carbon build up therein, to aid in maintaining said chamber hot and the throat thereof defining opening 49 at a temperature at least as high as the ignition temperature of said stream. This automatically continuously maintained enhanced combustion in chamber 41 acts to further preheat the stream, to further enhance diffusion and gasification and also serves to provide the other features above set forth. Under these conditions of operation, there is the additional advantage that the chambers 40 and 41 are maintained clean and foul free.

The so preheated burning stream of considerably enhanced fuel diffusion and gasification in traveling through the pre-main combustion zone of cylinder 65 is subjected to and combined with air entering said zone through the opposing radial openings 67 for maximum turbulence and eddy diffusion without imparting a whorling or spinning motion to the stream. By employing a number of rows of ports 67 as shown, air from the first row of ports 66 combines with some of the fuel molecules in the traveling burning stream in accordance with a collision pattern dictated by variables involved, but most likely with the faster moving and/or hotter fuel molecules whereby additional heat liberation occurs. This additional heat liberation causes additional heating of the stream and additional gasification of the fuel particles prior to reaching the air admitted from the next row of ports 67. This action is progressive so that when the resultant traveling burning stream reaches the discharge end of the pre-main combustion zone, it will be a highly transformed, greatly premixed fuel-gas and air stream which enters the main combustion space in furnace 10 to complete combustion therein.

While the use of a windbox for providing forced air into the pre-combustion zone is not critical, it is preferably used for forcing air into that zone whereby the aforesaid purposes are more effectively achieved and in addition aid so admitted at approximately right angles to the longitudinal axis of the stream serves to confine the cross sectional pattern of the burning traveling stream and further acts as a blanket to maintain the traveling hot particles in the stream and to prevent the spray-out of stray fuel either in the liquid or gaseous form therefrom.

If it should become desirable to supply more heat in the furnace, all that the operator need do is appropriately to adjust the conventional control of the pump or valve whereby the rate of fuel feed into tube 22 is changed to the desired value along with the correct accompanying amount of combustion air from blower 68 which thereafter is maintained constant until more or less heat is required. At this stage, like before, the only change which need be made is in the fuel pump or valve control and combustion air control whereby the rate of fuel feed is appropriately increased or decreased to meet the heat demand. Even with an inexpensive compressor rated at only about 3 to about 5 p.s.i., requiring only moderate input and being of long life, it is practical to operate effectively at various firing rates which may be as low as 1/3 and as high as 16 or more pounds of fuel oil per minute as a typical example for a single nozzle 22 or any other desired rate therebetween.

Specific examples of some of the fuels which may be fed into tube 22 are combustible liquids, the most prevalent of which are the hydrocarbon oils, such as diesel oil, fuel oils #2 to #6. Most #5 oils and all #6 oils require heating generally to about 180–220° F. so that they are of sufficiently low viscosity.

However, when the fuel to be mixed with the air stream is a gas, it is preferable that it be fed thereto through the conduit 55 which also is used if the fuel fed into the air stream is in the solid condition. Examples of the gases are any combustible gases, such as natural gas, carbon monoxide, various process waste gases, hydrogen, methane, propane, butane and petroleum refinery gases, etc.; solid fuels are sawdust, powdered coal or other finely divided combustible material. Such fuels or mixtures of two or more of them, whether singly or severally used, are fed into the air stream passing through chamber 40 as shown in FIG. 2 wherein the fuel is atuomatically admixed therewith. Light off is effected in chamber 41 as before, the ejector action is created in said chambers 40 and 41 as before and feed-backs in chambers 40 and 41 take place as before and flame propagation occurs and is followed by upstream flame propagation as before through opening 49 and into chamber 40. The burning stream is continually maintained in constant flame pattern, positions and flame retention as before stated in respect to the operation with the fuel feeding into the air stream being liquid. Like before one may go from high to low fire and vice versa by merely adjusting the control which regulates and maintains the rate at which the fuel in solid or gaseous condition is fed into chamber 40. The foregoing burner and systems are of significant versatility in that the commercially available natural gases may be used in those periods when they are economically available and when desired one may change from gas to solid fuel or to liquid fuel or to combinations of two or more different type fuels, fed into the air stream, air emanating from tube 22 continuously for all fuel types.

A plurality of individual burning streams of the type heretofore set forth and produced by the methods heretofore described in detail may be produced by using the embodiments shown in FIGS. 6–12.

By employing the embodiment shown in FIGS. 6 and 7, three of such streams are produced and continuously maintained, with the downstream parts thereof in the space 11 merging together thereby forming therein a substantially unitary burning column.

By employing the embodiment shown in FIGS. 11–12, four of such individual, one alongside the other, streams are produced and continuously maintained, with the downstream ends thereof in space 11 merging together thereby forming therein a substantially unitary burning wide band of considerable depth.

By employing the embodiment shown in FIGS. 8 and 9, six of such individual streams are produced and maintained. The longitudinal center line of the upstream part of each of them being at about right angles to the axial center line of the refractory collar or cylinder in communication with space 11 of furnace 10. The portions thereof downstream of their respective chambers 65c meet at about said axial center line when extended and there traveling in different directions strike each other, merge and together are diverted outwardly through the refractory collar 76 into space 11. The refractory collar and ring 72 have one or more rows of radial openings 77 (only one row being shown) through which passes forced air to aid in confining the merged burning mass passing therethrough and to aid in controlling its pattern so that the effective downstream burning ends or mass has the desired flame pattern in the space 11. When the cover 73 has the axial openings 75 therein, the forced air passing therethrough aids in increasing eddy diffusion and increased heating of said burning mass with consequent increased gasification of the fuel particles therein whereby the combustion time of the effective heat releasing ends of the stream extending into space 11 from the collar 76 is decreased. This particular embodiment shown in FIGS. 8 and 9 is especially effective in those instances where only limited furnace and firing space is available. This embodiment also is versatile in that not all of the burners need be used simultaneously. While only one may be in operation while the other five are shut down, it is preferable that at least two of them be simultaneously in operation. And, when only two are in operation, it is preferable that those two be in alignment, that is the axes of their tubes 22 extend towards each other in coincidence with a single straight line extending from the centers of the opposing discharge ends of the chambers 65c. When more than two are in operation, it is preferable that at least two of them are so disposed. Generally, it is preferred that the burners be operated in pairs, that is 1, 2 or 3 pairs, with each of any single pair being disposed relative to the other as said two above described. The individual burners of this embodiment may have the fuel supplied to their respective chambers 26 by a common fuel pump 29 or from individual pump 29 and by a common compressor 32 or individual compressor 32, the former being preferred. By employing individual pump 29, further versatility is afforded whereby the control of any individual pump may be changed thereby to raise or lower the fire from a particular burner without changing the fire of the other burners if such a condition is desired.

By employing the embodiment shown in FIG. 10, there are obtained six such individual burning streams of the types obtainable with the embodiment shown in FIGS. 8 and 9, the only essential difference being that the downstream parts of the burning streams outside of the pre-main combustion chambers are in a different arrangement. In this instance the streams emanating from chambers 65d travel mainly in lines which are approximately tangential to an imaginary circle concentric with the ring 72d thereby to provide a still different multi-flame spin pattern in ring 72d to suit applicable main furnace designs.

In the specific nozzles of all of the burners of all of the embodiments herein disclosed, the diameter of element 23 is preferentially about ⅓ to ⅔ and generally approximately ½ the diameter of tube 22. Also the tube 22 preferably has two or more orifices in one or more rows of narrow radial openings 25. Each of the burners in the embodiments shown in FIGS. 1, 8, 9 and 10, preferably has a conduit, such as 55 (FIG. 2), in the chamber 40, 40c and 40d for the admission of fuel in the gaseous or solid state into said chambers, and each of them has an ignition pilot in the second chamber corresponding to 41 of FIG. 1. The burner shown in FIGS. 6–7 has only one pilot in chamber 41d but three conduits, such as 55 (FIG. 2) in chamber 40a, with the conduits positioned 120° apart, the conduits also so positioned whereby the discharge streams of said conduits are directed toward the individual air streams. The burner shown in FIGS. 11 and 12 has one pilot in chamber 41b and four individual conduits 55 in chamber 40b.

Also in each instance where a conduit 55 is employed, it preferably has therein a valve 80 located near its discharge terminus so that when fuel is not being admitted into a chamber through conduit 55, it makes an air-tight seal with the conduit whereby when fuel is not being fed through conduit 55 in the chamber, its presence will not prevent achieving and maintaining the lower static pressure in said chamber. That is, when fuel is not being fed through conduit 55 into the chamber, this closed valve renders said chamber a closed imperforate chamber apart from its inlet and outlet openings, so that the lowering of the static pressure therein is effectively achieved and maintained by the stream from conduit 22 which passes through its outlet opening.

In all instances, the pre-main combustion chamber 65 is so dimensioned and positioned that essentially all (at least 98%) of the fuel in the traveling stream passes therethrough, because no measurable amount of fuel is intercepted thereby.

Each of said chambers 41, 41a, 41b, 41c and 41d may have a sensor 85 responsive to the light wavelength or temperature emanating from the burning stream of air laden fuel passing through those chambers. The sensor 85 is connected to conventional mechanism (not shown) for cutting off the fuel supply practically immediately upon extinguishment of said burning stream in those chambers, and permits fuel supply due to the intensity of light from the burning stream passing through those chambers. This sensor and its related mechanism are brought into circuit obviously after light-off.

Still another modification is that shown in FIGS. 13–16 illustrating still another type of novel burner. The specific embodiment therein shown is essentially the same as that shown in FIGS. 11 and 12 and differs therefrom mainly in that the sides thereof corresponding to sides 44d and 45d are respectively divided along the longitudinal center lines thereof into two equal parts 44e' and 45e', with openings corresponding to 49d and 50d (only 3 being shown), also being so divided to provide semi-circular openings 49e' and 50e', and with each of said parts 44e' and 45e' being swingable and means for swinging said parts.

In this embodiment, it is preferred that the refractory top and bottom of the chambers 40e and 41e thereof corresponding to chambers 40d and 41d and of the perforated element 65e corresponding to element 65d be respectively made of a single piece. Each of said parts 44e' and 45e' is keyed to a shaft 90 carried by bearings in the sides of the box and having a gear 91 keyed and operatively connected to a chain and gear drive mechanism 92 for swinging said parts 44e' and 45e' to the positions shown in FIGS. 14 and 15 or to various other positions therebetween.

This embodiment is especially useful in those instances where when the fuel employed, upon burning, is accompanied by the presence of a combustion-resistant or substantially non-combustible residues at the temperature produced thereby. As a consequence, some of the residue which is not carried along with the burning stream tends to and deposits upon the upstream faces of said parts 44e' and 45e' which are of such refractory selection that said residues do not become welded thereto.

The operation of this modification, which may be substituted for the burner 20d as heretofore described, is as before described, except that during and after light-off when the elements 44e' and 45e' are in the position shown in FIG. 14 and defining openings 49e and 50e corresponding essentially to 49d and 50d of FIG. 12 and the individual chambers 40e and 41e respectively reach such elevated temperatures that the flame is maintained, the parts 44e' and 45e' are swung from their working positions shown in FIG. 14 to their ultimate non-working positions shown in FIG. 15 or to some other position therebetween and preferably later ultimately to the positions shown in FIG. 15. While parts 44e' and 45e' are in their working positions, shown in FIGS. 13 and 14, due to the nature of the fuel used, some deposition of solid matter occurs on the upstream faces thereof at and around the openings 49e and 50e. If this were permitted to continue, these throats would become so fouled as to render the burner inefficient and eventually inoperative. Consequently, by time-programming or by a temperature sensor (not shown) or manually or by any other desired means, the shaft 90 are rotated either simultaneously by the shown drive mechanism or one after the other by other drive mechanism (not shown) to swing the pairs of 44e' and 45e' to the desired position. They are swung to such positions that these parts are so disposed as to be near the hot flaming stream and are maintained in said positions, that the flaming fuel column passing the upstream surfaces thereof burns off the residue originally deposited on parts 44e' and 45e' and/or sweeps said particles off of said surfaces and carries same outside of said element 65e where they are eventually deposited. Then the parts 44e' and 45e' are swung to their ultimate non-working positions in the recesses as shown in FIG. 15. In this manner, the normally upstream faces of parts 44e' and 45e' are rendered substantially free of residue due to the combustion of the residue from heat supplied by the traveling burning fuel stream and/or the scrubbing action of said stream.

This latest embodiment finds especial utility where the fuel being burned is a high ash solid fuel supplied through a conduit 55e corresponding to 55d with or without a liquid fuel such as a hydrocarbon oil supplied through conduit 22, where residue would be deposited during that period after light-off that the temperatures of the chambers are being increased. It also finds especial utility in those instances where liquid fuels supplied through tubes 22 which contain inorganic and/or organic matter present as solutes or dispersions, and/or those which upon combustion produce non-combustible or combustible resistant residues.

The principle embodied in FIGS. 13–16 and the method of operation as heretofore described may also be employed in the other embodiments of the invention as shown in FIGS. 1–10. When employed, it is preferable that instead of having cylindrical walls for the chambers and pre-main combustion chambers as shown therein, they are preferably of box-type form, and the configuration of elements 43, 44 and 45 of FIGS. 1 and 2 as well as the corresponding elements of FIGS. 8–10 are square and divided into two equal parts as those of FIGS. 13–15 and so hinged and operated in the manner before set forth.

The configuration of burner 20a and elements 43a, 44a and 45a of the construction shown in FIGS. 6–7 are also changed to square form, and in this embodiment, the element corresponding to 44a has four equally spaced openings the same as 49a and element corresponding to 45a has four equally spaced openings corresponding to 50a. A diameter of each of the openings corresponding to 49a is on a diagonal of the square element corresponding to 44a; and a diameter of each of the openings corresponding to 50a is on a diagonal of the square element corresponding to 45a. These squares are divided along said diagonals, thereby providing 4 triangular parts in each square, with each triangular part having a semi-circular opening in a side thereof. These triangular parts are swingable at their bases to open or closed or other positions heretofore described by being connected to rotatable shafts operatively coupled to appropriate drive mechanisms. And, the operation thereof is as before described.

In all instances herein, FIGS. 1–16, air under pressure is discharged through the discharge terminus of a nozzle at a velocity of about 150–1200 and preferably 200–450 feet per second into chamber 40, FIG. 1, and the corresponding chambers shown in the other figs. to provide a non-whirling stream having an outside diameter preferably less than the diameter of the outlet in said chamber. This stream is a substantially single stream or a composite of a number of individual streams which may be provided by using a plate similar to plate 23 except that it extends across the entire tube 22 of FIG. 1 and has a number, 3, 4, 6 or more separate openings therein equally spaced from each other and having centers on a circle whose diameter is less than that of tube 22. With the latter, the individual streams emanating from that nozzle merge into a single stream a short distance downstream of the so modified plate 23. The term, the diameter of the stream entering said chamber, is meant to mean the outside diameter of the stream as it leaves the nozzle when in the form of a substantially single stream or of a circle extending around individual streams thereat even before they have truly merged into a single stream. Also in all instances, the stream emanating from the nozzle comprises air under pressure and may or may not include fuel as a component thereof, depending upon the desire of the operator. In the burner, such as 20a, that shown in FIGS. 6 and 7, the height or diameter of chambers 40 or 41 is preferably equal to the pitch circle of set of openings 49 or 50 plus about 1½ to about 6 times the diameter of openings 49 or 50 respectively. In the embodiment shown in FIGS. 11–16, the diameter of openings 49b and 49e is no greater than about ¾ of the height of chambers 40b and 40e respectively and preferably no less than about ⅕ of said respective heights in the range of about ⅓–about ⅔ of said respective heights. In said embodiments shown in FIGS. 11–16, the cross sectional area of the sum of the openings 49b and the sum of the openings 49e are respectively no greater than ⅔, preferably no less than ⅒ and about ⅙–about ⅓ the cross sectional area of chambers 40b and 40e respectively, said cross sectional areas taken in a plane at right angles to the path of flow of the streams from the nozzles through said chambers.

Also in all instances, in the operation of the specific constructions herein described, due to the ejector action, the static pressure in chamber 40 and corresponding chambers, either in the absence or presence of chamber 41 and corresponding chambers is less than the static pressure in the spaces at the respective downstream side thereof. The static pressure in chamber 40 and the other corresponding chambers is at least about .1" of water pressure less than that in chamber 41 and other corresponding chambers and that in chamber 41 and other corresponding chambers is at least .1" of water pressure less than that in the respective zones downstream of the downstream sides thereof. When chambers 41 and their corresponding chambers are not present, the static pressure in chambers 40 and their corresponding equivalents is preferably at least .2" of water pressure less than that in the respective zones downstream thereof. For most purposes the static pressure in chambers 40 and 41 and their corresponding chambers is between about .1"–1" of water pressure less than that in respective zones downstream thereof whereby effective ejector action is created, exerted and maintained for the purposes heretofore described.

Since certain changes in carrying out the above process and in the constructions set forth which embody the invention may be made without departing from its scope, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention, which as a matter of language might be said to fall therebetween.

I claim:

1. Apparatus for burning fuel for supplying heat in a main combustion space, comprising:
    (A) a chamber having inlet first means and outlet second means therein, said outlet means being in the normally downstream side of said chamber,
    (B) third means for continuously producing a mixture of fuel and air and feeding said mixture in a non-whirling path through said outlet means and then downstream thereof, said third means including fourth means for continuously feeding a stream, comprising air under pressure, through said inlet means thence towards said outlet means,
    (C) means for igniting said mixture initially downstream of said inlet means,
    (D) said inlet means and said outlet means being so positioned and dimensioned that said mixture continuously feeding in said non-whirling path into and through said outlet means creates and maintains ejector action in said chamber to reduce and maintain static pressure in said chamber to less than that in space adjacent to and downstream of said side, and after ignition of said mixture initially downstream of said inlet means, the flame produced propagates upstream, and some matter downstream of said side travels upstream substantially continuously through said outlet means and into said chamber to enhance combustion therein thereby to aid in heating said mixture in the course of said continuously feeding of said mixture into said outlet means, and also to aid in preventing flame-out.

2. Apparatus according to claim 1, said outlet means being in approximate alignment with said stream as it enters said chamber, the diameter of said outlet means being greater than the diameter of said stream as it enters said chamber and being in the range of about ⅔–about 1⅓ times the sum of the depth of said chamber and the diameter of said stream as it enters said chamber.

3. Apparatus according to claim 1, said fourth mentioned means including means for continuously supplying air under pressure of at least 2 p.s.i. but incapable of supplying air under pressure in excess of 20 p.s.i.

4. Apparatus according to claim 2, said fourth mentioned means including an at least 2 to no greater than about 10 p.s.i. air compressor.

5. Apparatus according to claim 2, said third mentioned means including an at least 2 and no greater than about 6 p.s.i. air compressor.

6. Apparatus according to claim 1, and a chamber normally downstream of said first mentioned chamber and having inlet means and outlet means therein, said chambers being in communication with each other through the outlet means of the first mentioned chamber and the inlet means of said second mentioned chamber for receiving said mixture continuously feeding out of said first mentioned chamber, said outlet means of said second chamber being larger than and in approximate alignment with the outlet means of said first chamber, said outlet means of said second mentioned chamber being so dimensioned and positioned relative to the outlet means of said first mentioned chamber that, said continuously feeding mixture entering said second mentioned chamber travels through said second mentioned chamber and said second mentioned outlet means and then downstream thereof to create and maintain ejector action in said second mentioned chamber to reduce and maintain static pressure in said second mentioned chamber to less than that in space adjacent to and downstream of said second mentioned chamber but greater than that in said first mentioned chamber and some of the matter downstream of said second mentioned chamber travels upstream substantially continuously through said outlet means in said second mentioned chamber and into said second mentioned chamber to enhance combustion therein thereby to aid in heating said mixture in the course of said continuous feeding of said mixture therethrough and to aid in preventing flame-out.

7. Apparatus according to claim 6, the diameter of said second mentioned outlet means being in the range of about ⅔ to about 1⅓ times the sum of the diameter of said stream as it enters said first mentioned chamber and one-half the distance between said second mentioned outlet means and said stream at its entry into said first mentioned chamber.

8. Apparatus according to claim 7, said fourth means including a nozzle, said outlet means in said first mentioned chamber being in approximate alignment with said stream as it enters said first mentioned chamber after discharge from said nozzle, the diameter of said outlet means in said first mentioned chamber being greater than the diameter of said stream as it enters said first mentioned chamber after discharge from said nozzle and being in the range of about ⅔ to about 1⅓ times the sum of the depth of said first mentioned chamber and the diameter of said stream entering said chamber after discharge from said nozzle.

9. Apparatus according to claim 2, said third means including means adapted to supply fuel to said air under pressure before it enters said chamber.

10. Apparatus according to claim 2, said third means including means adapted to supply fuel to said stream after it enters said chamber and before it passes beyond said outlet means.

11. Apparatus according to claim 2, said third means including means adapted to supply fuel in a liquid condition to said air under pressure before it enters said chamber and means adapted to supply fuel in the gaseous or solid condition to said stream after it enters said chamber and before it passes beyond said outlet means.

12. Apparatus according to claim 8, and hollow means downstream of said second mentioned chamber and in communication with said space and said outlet means of said second mentioned chamber and having a plurality of transverse openings therein for the passage of air to supply air to said mixture passing therethrough, and being so dimensioned and positioned that essentially all of the fuel in said mixture entering said hollow means passes through the discharge terminus thereof.

13. Apparatus according to claim 1, and hollow means downstream of said chamber and defining a zone which is in communication with said main combustion space and said outlet means, said last mentioned means having a plurality of transverse openings therein for the passage of air into said zone to supply air to said mixture passing therethrough, said last mentioned means being so dimensioned and positioned that essentially all of the fuel in said mixture entering therein passes through the discharge terminus thereof, and means for forcing air through said openings to supply air to said mixture and to aid in preventing spraying out of the fuel in said mixture passing through said hollow means.

14. Apparatus according to claim 8, said fourth means including an air compressor rated at least 2 p.s.i. but not in excess of about 6 p.s.i.

said ignition means adapted to ignite said mixture initially in said second mentioned chamber.

15. Apparatus accordng to claim 2, means including a tube having a plurality of transverse openings therein, means for supplying fuel through said openings and into said tube, means, including an at least 2 and no greater than 20 p.s.i. air compressor, for supplying air under pressure into said tube, and means near the discharge terminus of said tube, extending transversely thereof and incompletely closing the tube thereat thereby providing passage of said stream into said chamber, the discharge terminus of said tube and outlet means being approximately in alignment.

16. Apparatus according to claim 1, said outlet means comprising a plurality of outlet openings, said inlet means comprising a plurality of inlet openings in the upstream side of said chamber, said outlet openings being in approximate alignment with said inlet openings respectively, said fourth means including a plurality of nozzles, said outlet openings being in approximate alignment with the discharges ends of said nozzles respectively, the diameter of each of said outlet openings being in the range of about ⅔ to about 1⅓ times the sum of the diameter of the stream as it enters said chamber after discharge from said end of the nozzle in alignment therewith and the distance between said outlet opening and said stream at its entry into said chamber.

17. Apparatus according to claim 16, and a chamber normally downstream of said first mentioned chamber and having outlet openings in the downstream side thereof and being in communication with said first mentioned chamber through said outlet openings in said first mentioned chamber, said outlet openings in said second mentioned chamber being in approximate alignment with the respective openings in said first mentioned chamber, said outlet openings in said second mentioned chamber being so dimensioned and positioned relative to the outlet openings in said first mentioned chamber that, during continuous feeding of said mixture through said second mentioned chamber and then downstream thereof, ejector action is thereby exerted to reduce and maintain static pressure in said second mentioned chamber to less than that in space adjacent to and downstream of said second mentioned chamber but greater than that in said first mentioned chamber and some of the matter downstream of said second mentioned chamber travels upstream continuously through said outlet openings in said second mentioned chamber and into said second mentioned chamber to aid in heating said mixture in the course of said continuous feeding of said mixture therethrough and to aid in preventing flame-out, the diameter of each of said outlet openings in said second chamber being in the range of about ⅔ to about 1⅓ times the sum of the diameter of the stream as it enters said chamber after discharge from the end of the nozzle in alignment therewith and one half the distance between said outlet opening and said stream as it enters said chamber.

18. Apparatus according to claim 16, said third means including means for supplying fuel in the liquid state to said air under pressure before it discharges from said nozzle,
said fourth means including an air compressor rated at least 2 p.s.i. but not greater than 20 p.s.i.

19. Apparatus according to claim 16, said third means including means for supplying fuel in the gaseous state to said air under pressure after it discharges from said nozzle and before it passes through said outlet openings,
said fourth means including an air compressor rated at least 2 p.s.i. but no greater than about 6 p.s.i.

20. Apparatus according to claim 13, in combination with a furnace having an opening therein, said opening being in communication with said combustion space in said zone and with said chamber.

21. Apparatus according to claim 16, in combination with a furnace having an opening therein in communication with the working combustion space therein and with said chamber through said outlet openings therein.

22. A multiple burner apparatus comprising a plurality of apparatus according to claim 1, arranged so that the longitudinal axes of the streams therefrom are approximately radially disposed with respect to each other.

23. A multiple burner apparatus comprising a plurality of apparatus according to claim 1, arranged so that the longitudinal axes of the streams therefrom are approximately tangential to an imaginary approximate circle.

24. Apparatus according to claim 22, in combination with a furnace having an opening therein which is in communication with the heating zone of said furnace and the zone in which said streams extend,
and means for supplying air under pressure to said streams and in a direction towards said streams and said furnace opening.

25. Apparatus according to claim 1, said downstream side of said chamber being movable away from the center of said stream.

26. Apparatus according to claim 1, said downstream side of said chamber being a plurality of recessed parts, with said recesses defining said outlet means, said parts being movable to move the recesses therein away from the center of said stream.

27. A method for burning fuel comprising:
continuously producing a mixture of air and said fuel,
continuously feeding said mixture in a non-whirling path through an outlet in the downstream side of a chamber by continuously feeding from a nozzle into and through said chamber and outlet a non-whirling stream comprising said air,
igniting said mixture downstream of said nozzle,
said feeding of said mixture exerting and maintaining ejector action in said chamber to reduce and maintain static pressure in said chamber to less than that in space adjacent to and downstream of said chamber, so that after ignition some of the matter downstream of said side travels upstream through said outlet and into said chamber to aid in heating said stream and to aid in preventing flame-out,
maintaining the velocity of said stream at the discharge terminus of said nozzle in the range of about 150–1200 feet per second.

28. A method according to claim 27,
said velocity being in the range of about 200–about 450 feet per second.

29. A method according to claim 27,
supplying said air to said nozzle from an electric air compressor rated at least 2 and no greater than about 6 p.s.i.,
said velocity being in the range of about 200–about 450 feet per second,
adding said fuel in a liquid state to said air before it is discharged from said nozzle.

30. A method according to claim 27,
supplying said air to said nozzle from an electric air compressor rated at least 2 and no greater than about 6 p.s.i.,
said velocity being in the range of about 200–about 450 feet per second,
adding said fuel in a gaseous state to said air after it has discharged from said nozzle and before it has passed through said outlet.

31. A method according to claim 27,
feeding said mixture from said outlet into and through a second chamber and an outlet opening in its downstream side to create and maintain ejector action therein to reduce and maintain static pressure therein to less than that in space adjacent to and downstream of said second mentioned side but greater than the static pressure in said first mentioned chamber whereby matter downstream of said second mentioned downstream side travels upstream therethrough and into said second mentioned chamber to aid in heating said mixture passing therethrough.

32. A method according to claim 31,
supplying said air to said nozzle at a pressure of at least 2 and no greater than about 6 p.s.i., igniting said mixture in said second mentioned chamber,
said velocity being in the range of about 200–about 450 feet per second.

33. A method according to claim 27,
and maintaining said outlet in approximate alignment with said stream as it enters said chamber and the diameter thereof in the range of about ⅔ to about 1⅓ times the sum of the depth of said chamber and the diameter of said stream as it discharges from said nozzle into said chamber.

34. A method according to claim 33,
with said chamber being substantially imperforate and comprising said downstream side, a hollow member and an upstream side spaced from said downstream side and having an inlet therein, said inlet being close to said nozzle, the diameter of said outlet being substantially less than that of the interior of said hollow member, the diameter of said inlet being substantially less than that of the interior of said hollow member, and the distance between said sides being in the range of about 1″–about 7″,
said static pressure in said chamber being reduced by at least 0.1″ of water pressure less than that in said space adjacent to and downstream of said diameter.

35. A method according to claim 31,
with said first mentioned chamber being substantially imperforate and comprising said first mentioned downstream side, a hollow member and an upstream side spaced from said first mentioned downstream side and having an inlet therein, said inlet being close to said nozzle, the diameter of said outlet being substantially less than that of the interior of said hollow member, the diameter of said inlet being substantially less than that of the interior of said hollow member, the distance between said sides being in the range of about 1″–about 7″;
said outlet being in approximate alignment with said stream as it enters said chamber and the diameter of said outlet being in the range of about ⅔ to about 1⅓ times the sum of the distance between said sides and the diameter of said stream as it discharges from said nozzle into said chamber;
with said second mentioned chamber being substantially imperforate and comprising said second mentioned downstream side, a hollow member and an upstream side spaced from said second mentioned downstream side and having an inlet opening therein, the diameter of said outlet opening being substantially less than that of the interior of said second mentioned hollow member, the diameter of said inlet opening being substantially less than that of the interior of said second mentioned hollow member, the distance between said last two mentioned sides being in the range of about 1"–about 7";
said inlet and outlet openings being in approximate alignment with said stream as it enters said first mentioned chamber, the diameter of said outlet opening being in the range of about ⅔ to about 1⅓ times the sum of the diameter of said stream as it enters said first mentioned chamber and one half the distance between said outlet opening and said stream at its entry into said first mentioned chamber;
said static pressure in said first mentioned chamber being reduced by at least 0.1" of water pressure less than that in said second mentioned chamber;
said static pressure in said second mentioned chamber being reduced by at least 0.1" of water pressure less than that in space downstream of said second mentioned downstream side.

36. A method according to claim 35,
and initially igniting said mixture in said second mentioned chamber.

37. A method according to claim 36,
adding said fuel in a liquid state to said air before it is discharged from said nozzle.

38. A method according to claim 37,
terminating the addition of said fuel in a liquid state and adding said fuel in the gaseous state or finely divided solid state to said air after it has discharged from said nozzle and before it has passed through said first mentioned outlet.

39. A method according to claim 27,
adding said fuel in the liquid state to said air before it is discharged from said nozzle.

40. A method according to claim 27,
adding said fuel in a gaseous state to said air after it has discharged from said nozzle and before it has passed through said outlet.

41. A method according to claim 27,
adding said fuel in a finely divided solid state to said air after it has discharged from said nozzle and before it has passed through said outlet.

42. A method for burning fuel comprising continuously producing mixtures of said fuel and air;
continuously feeding each of said mixtures in non-whirling paths through spaced outlets in the downstream side of a chamber by continuously feeding from a plurality of spaced nozzles into and through said chamber and outlets a plurality of spaced non-whirling streams comprising said air;
igniting said mixtures downstream of said nozzles;
said feeding of said mixtures through said outlets exerting and maintaining ejector action in said chamber to reduce and maintain static pressure in said chamber to less than that in space adjacent to and downstream of said side, so that after ignition some of the matter downstream of said side travels upstream substantially continuously through said outlets and into said chamber to aid in heating said streams and preventing flame out, maintaining the velocity of each of said streams at the discharge terminals of said nozzles in the range of about 150–1200 feet per second.

43. A method according to claim 42,
said mixtures from said outlets continuously traveling individually into and through a second chamber and spaced outlets in the downstream side thereof, and then downstream thereof, said second chamber being in communication with said first mentioned chamber, said second mentioned outlets being in approximate alignment with said first mentioned outlets and the discharge ends of said nozzles;
said traveling of said mixtures into and through said second chamber and said second mentioned outlets creating and maintaining ejector action in said second chamber to reduce and maintain static pressure in said second chamber to less than that in space adjacent to and downstream of said second mentioned outlets but greater than that in said first mentioned chamber and some of the matter downstream of said second mentioned side travels upstream substantially continuously through said second mentioned outlets and into said second chamber to enhance combustion therein thereby to aid in heating said mixtures in the course of their traveling through said second chamber and to aid in preventing flame out.

44. Apparatus according to claim 2,
said chamber comprising a hollow member which is substantially imperforate, said side coupled with said member and being substantially imperforate and a second side coupled with said member, spaced from said first mentioned side and being substantially imperforate, said chamber being substantially imperforate, with said first means being in said first mentioned side and of a diameter substantially less than the internal diameter of said member thereat, said second means being in said second side and of a diameter substantially less than the internal diameter of said body member thereat,
said static pressure in said chamber being reduced by at least 0.1" of water pressure less than in space downstream of said first mentioned side,
the distance between said sides being in the range of about 1"–about 7".

45. Apparatus according to claim 8,
the diameter of said second means being substantially less than that of said first mentioned chamber and greater than that of said stream as it enters said first mentioned chamber and such as to permit essentially all of said fuel in said mixture to pass through said second means and reduce said static pressure in said first mentioned chamber by at least about 0.1" of water pressure less than that in said second mentioned chamber;
the diameter of said outlet means in said second mentioned chamber being substantially less than the diameter of said second mentioned chamber and such as to permit essentially all of said fuel to pass through said outlet means in said second mentioned chamber and reduce said static pressure in said second mentioned chamber by at least about 0.1" of water pressure less than that in said third mentioned space;
said first mentioned chamber comprising a substantially imperforate hollow member, said side secured to one end of said member and a second side secured to the other end of said member and having said inlet first means therein, said sides being substantially imperforate, said first mentioned chamber being substantially imperforate;
said second mentioned chamber comprising a second substantially imperforate hollow member, a substantially imperforate side secured to one end of said second member and having said second mentioned outlet means therein, a substantially imperforate side secured to the other end of said second member and having said second mentioned inlet means therein, said second mentioned chamber being substantially imperforate;
the distance between said first and second mentioned sides being in the range of about 1"–about 7" and the distance between said third and fourth mentioned sides being in the range of about 1"–about 7".

46. Apparatus for burning fuel comprising:
a substantially imperforate chamber comprising a substantially imperforate hollow body, a substantially imperforate side at one end of said body, and having an opening therein, a substantially imperforate side at the other end of said body, said second mentioned side having an opening therein and spaced from said first mentioned side, the diameter of each of said openings being substantially less than the internal diameter of said body;

means including a nozzle at one end and an air compressor operatively connected thereto and rated at least 2 p.s.i. and not greater than 20 p.s.i. for continuously feeding into said chamber a stream comprising a mixture of air and fuel in the liquid state and in atomized condition out of said nozzle at a velocity in the range of about 150–1200 feet per second and thence from said nozzle in a non-whirling path through said chamber, said first mentioned opening and then downstream thereof; the outer wall of said third mentioned end being close to the perimeter of said second mentioned side defining said second mentioned opening;

means for initially igniting said stream downstream of said second mentioned side;

said first mentioned opening having a greater diameter than that of said stream as it enters said chamber and being so dimensioned and positioned that practically all of the fuel in said non-whirling stream passes through said chamber and said first mentioned opening to create and maintain ejector action in said chamber and reduce and maintain static pressure in said chamber by at least 0.1″ of water pressure less than that in space adjacent to and downstream of said first mentioned side and after ignition of said stream and continued burning of said stream some matter downstream of said first mentioned side travels upstream substantially continuously through said first mentioned opening and into said chamber to enhance combustion therein thereby to aid in heating said stream in the course of continuous feeding thereof through said chamber and also to prevent flame out;

the diameter of said first mentioned opening being about 25%–about 75% greater than that of a section thereat of a 25° imaginary cone whose altitude is coincident with the center of said nozzle and whose side passes through the periphery of said nozzle;

the distance between said sides being in the range of about 1″–about 7″;

47. Apparatus according to claim 46, a second substantially imperforate chamber for receiving said stream continuously feeding out of said first mentioned opening, said second chamber comprising a substantially imperforate hollow body, a substantially imperforate side for one end of said second mentioned body and a substantially imperforate side for the other end of said second mentioned body, each of said last two mentioned sides having an opening therein, the diameter of each of said last two mentioned openings being substantially less than the internal diameter of said second mentioned body;

said opening in said third mentioned side being so positioned and dimensioned relative to said first mentioned opening that said continuously feeding of said stream entering said second mentioned chamber travels through said second mentioned chamber and said third mentioned opening and then downstream thereof to create and maintain ejector action in said second mentioned chamber to reduce and maintain static pressure in said second mentioned chamber by at least 0.1″ of water pressure less than that in space adjacent to and downstream of said third mentioned side and after ignition of said stream and continued burning of said stream some matter downstream of said third mentioned side travels upstream substantially continuously through said third mentioned opening and into said second mentioned chamber to enhance combustion therein thereby to aid in heating said stream in the course of continuous feeding thereof through said second mentioned chamber and also to prevent flame out;

the distance between said last two mentioned sides being in the range of about 1″–about 7″;

the diameter of said third mentioned opening being in the range of about $2/3$ to about $1 1/3$ times the sum of the diameter of said stream as it enters said first mentioned chamber and $1/2$ the distance between said third mentioned opening and said stream at its entry into said first mentioned chamber.

48. Apparatus according to claim 47, the internal diameter of each of said chambers being about $1 1/2$ to about 5 times the diameter of said opening in said third mentioned side.

References Cited

UNITED STATES PATENTS

| | | | |
|---|---|---|---|
| 1,508,718 | 9/1924 | Peabody | 158—1.5 |
| 1,803,967 | 5/1931 | Good | 158—73 |
| 2,473,347 | 6/1949 | Sanborn | 158—76 |
| 2,539,165 | 1/1951 | Saha | 158—1 |
| 3,266,550 | 8/1966 | Sick et al. | 158—4 |

CHARLES J. MYHRE, *Primary Examiner.*

FREDERICK L. MATTESON, Jr., *Examiner.*

E. G. FAVORS, *Assistant Examiner.*